Feb. 8, 1955    R. E. RISLEY    2,701,731
REINFORCED LARGE DIAMETER COUPLING
Filed May 13, 1949    5 Sheets-Sheet 4
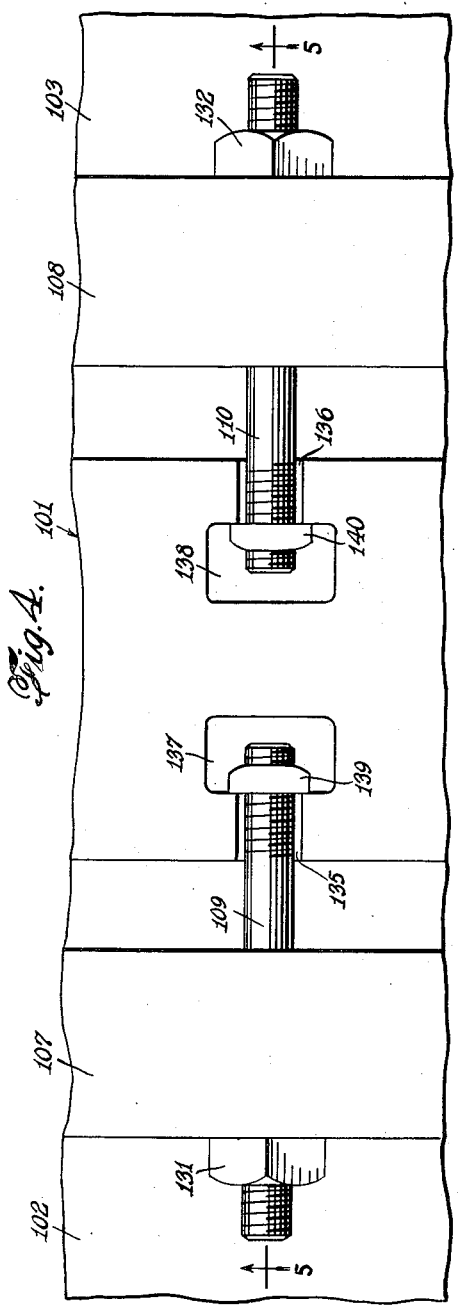
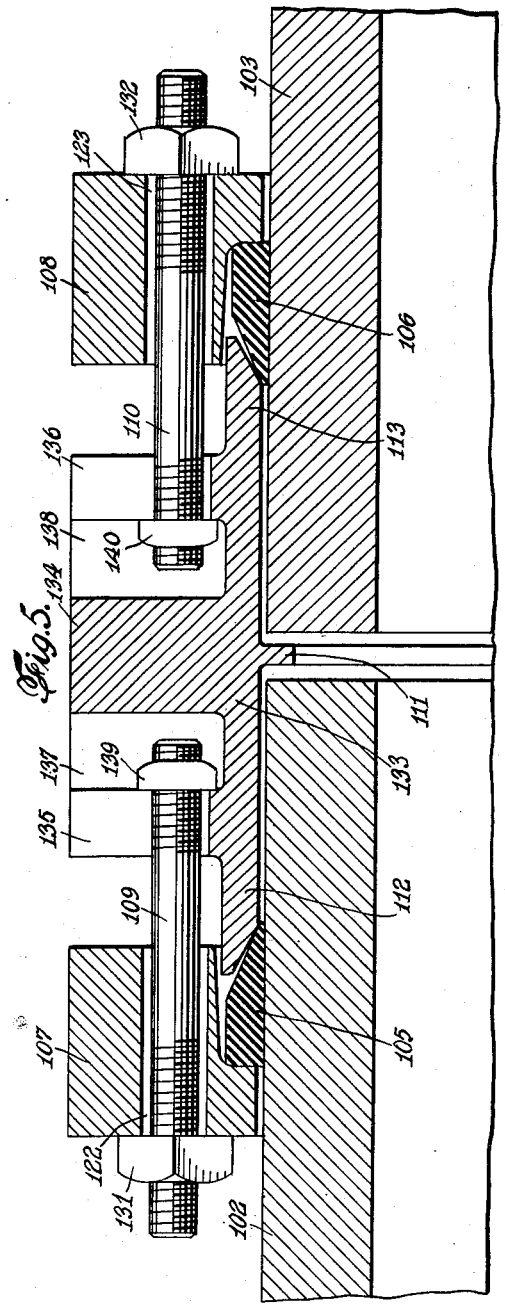
INVENTOR.
ROGER E. RISLEY.
BY
ATTORNEY.

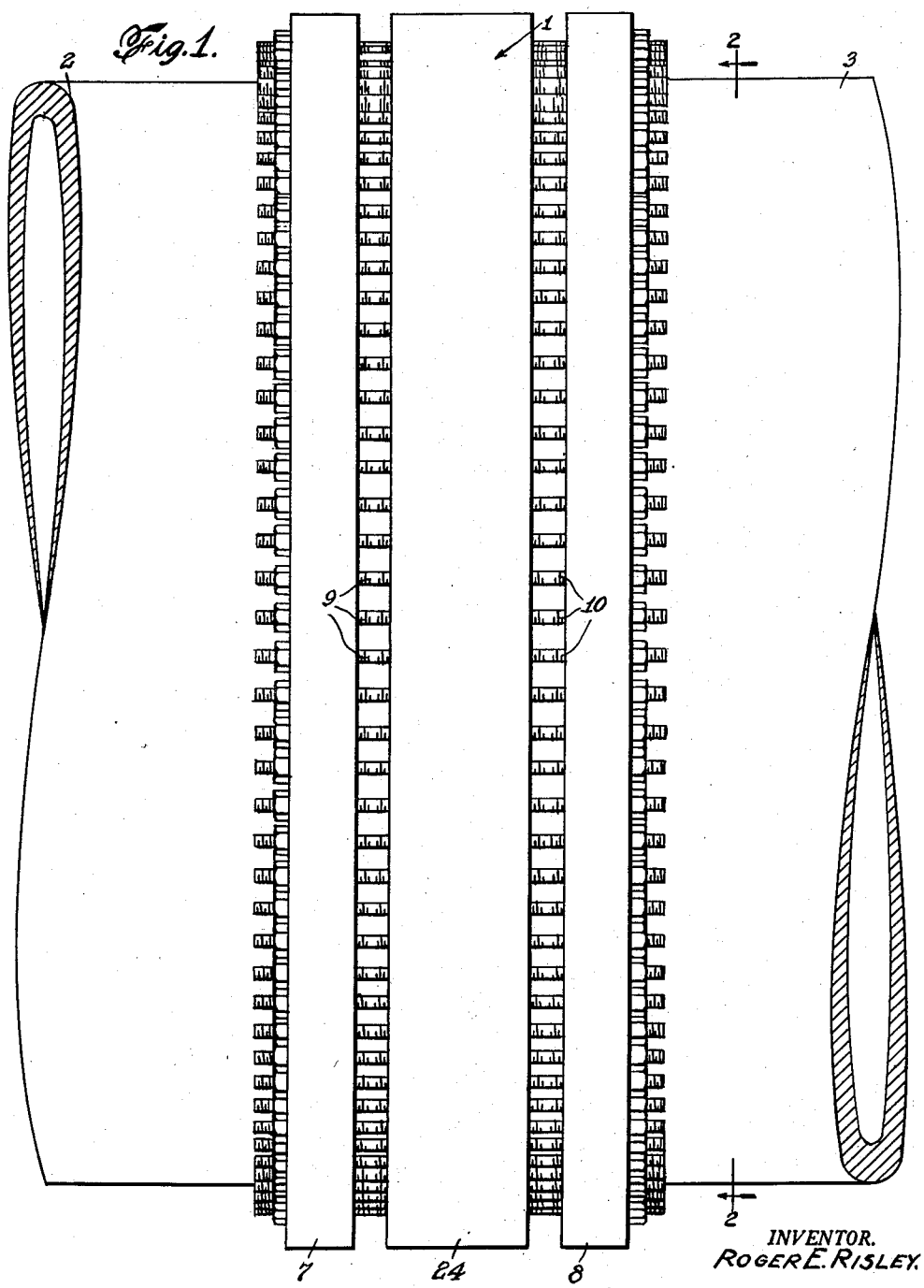

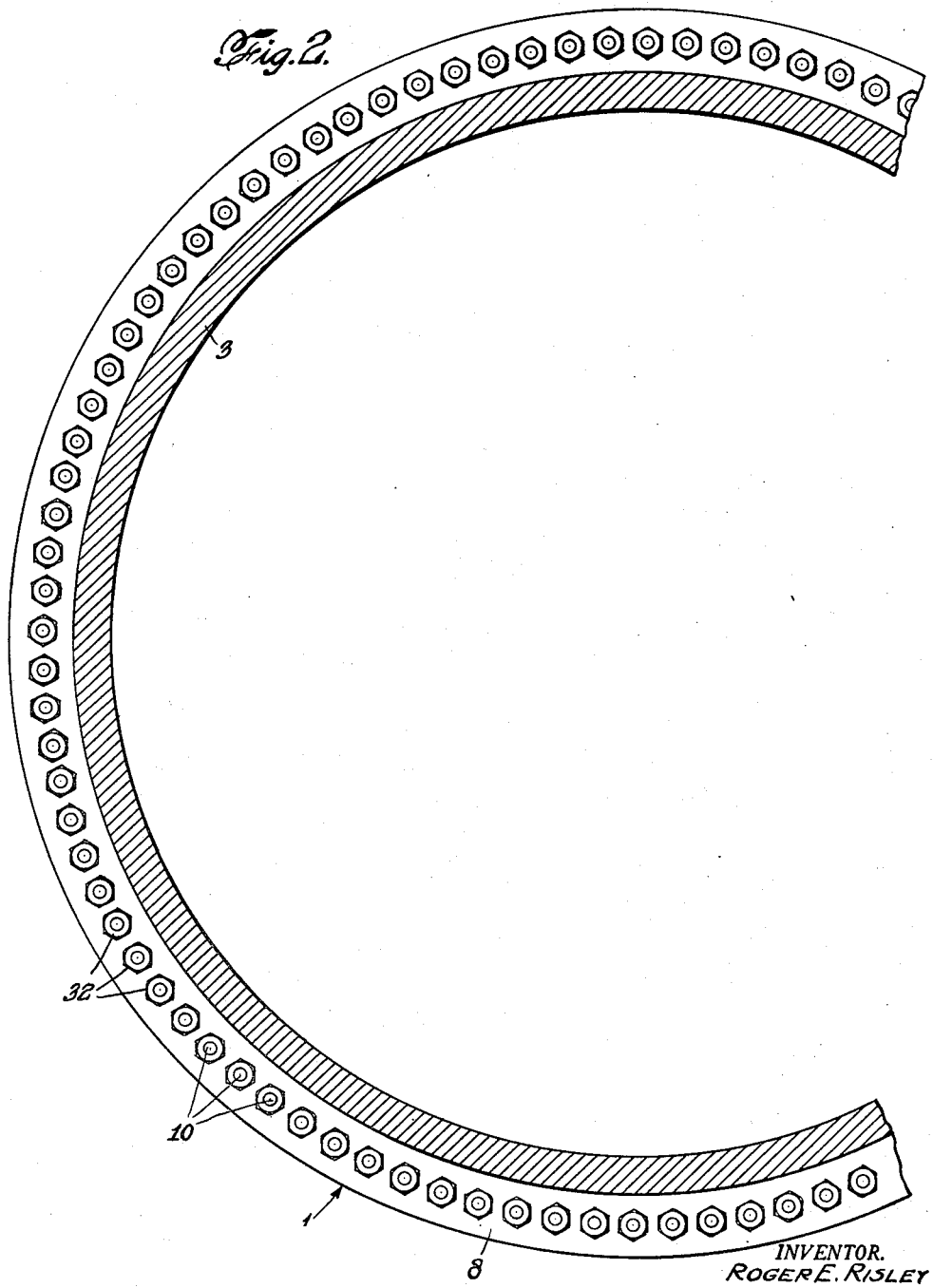

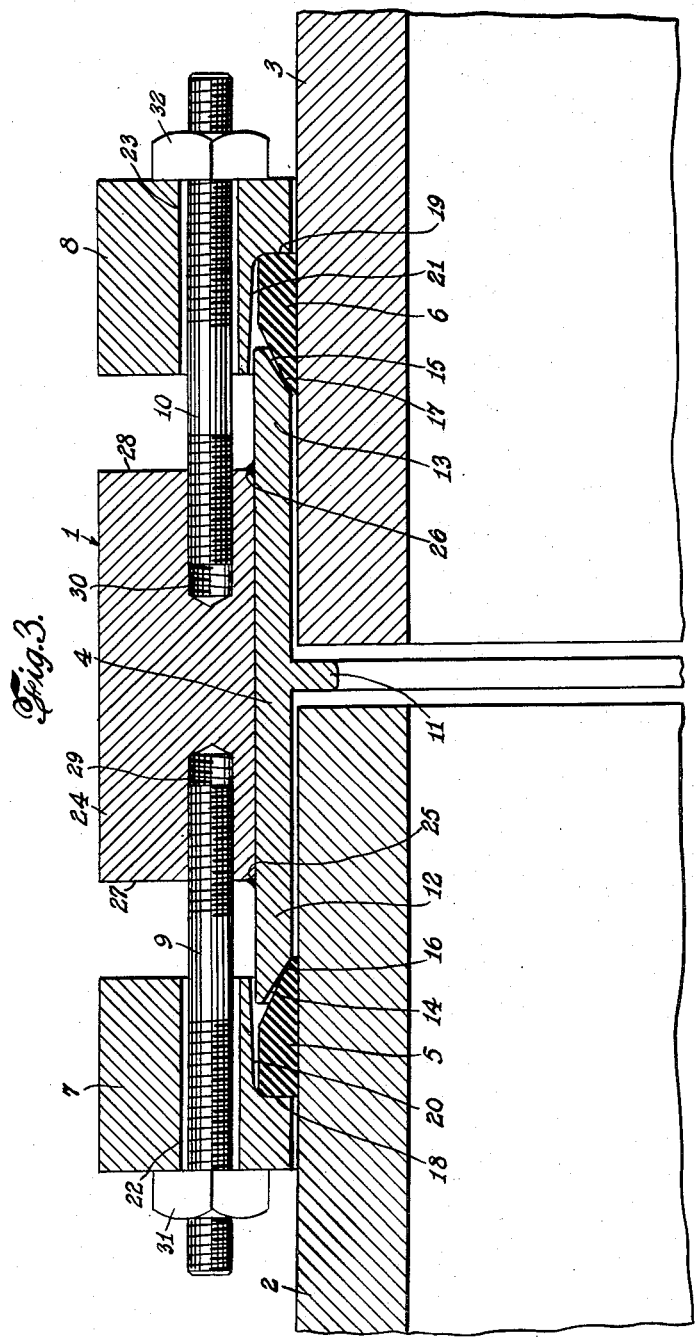

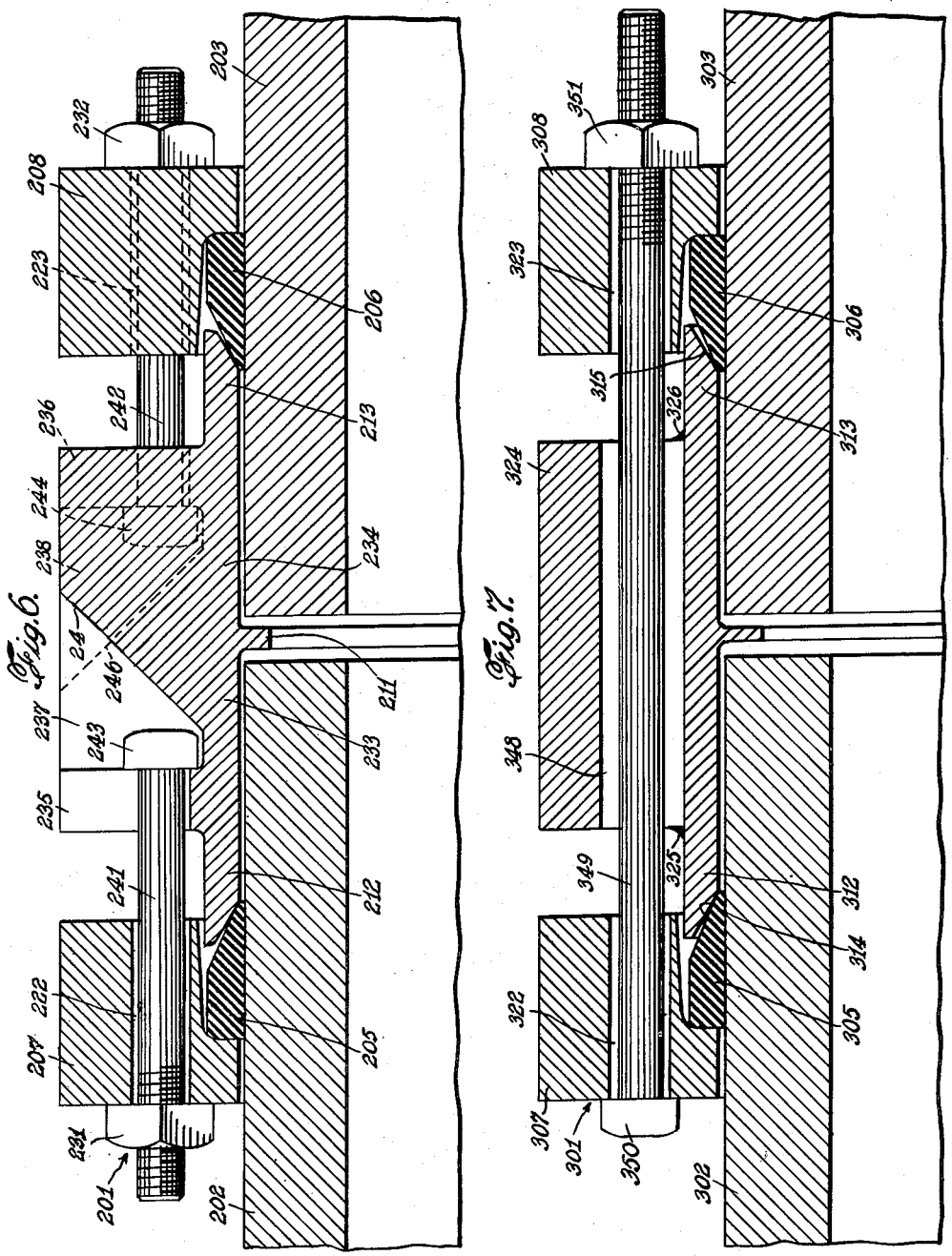

United States Patent Office 2,701,731
Patented Feb. 8, 1955

2,701,731

REINFORCED LARGE DIAMETER COUPLING

Roger E. Risley, Bradford, Pa., assignor to Dresser Industries, Inc., Cleveland, Ohio, a corporation of Pennsylvania Application May 13, 1949, Serial No. 93,005

6 Claims. (Cl. 285—134)

The present invention relates to gasket sealed pipe couplings and particularly to an improved coupling for use on pipe of large diameter, such as penstocks.

In the construction of a satisfactory coupling for penstocks or, in general, for pipes of great size, for instance of a diameter of 48" or more, and/or high pressure requirements, several problems arise. A general type of coupling may comprise a middle ring or sleeve member surrounding the pipe at the joint and provided at each end with some kind of packing recess, suitable packing rings or gaskets engaging said recesses, follower rings engaging the gaskets to apply sealing pressure thereto, and clamping bolt members extending between the two follower rings for drawing up the coupling, these bolt members passing through registering apertures in the follower rings. The follower rings must extend outside the periphery of the packing recesses to provide the bolt apertures, which causes the bolt strain to be exerted at a substantial distance from the pipe wall and therefore imposes a severe turning or rolling moment on the rings, necessitating a strong construction of the latter.

In adapting couplings of this general type to pipes of large diameter, such as penstocks, it has been found impractical to make the sleeve member of the thickness normally required to provide adequate strength in the coupling. In making the sleeve member thicker, the bolt circle diameter must be increased, resulting in a still greater moment tending to turn or roll the follower rings outwardly from the wall of the pipe, thus also necessitating the use of considerably heavier follower rings. Furthermore, unless expensive machining or forming is performed on the sleeve member, it is necessary to make the radial thickness of the packing ring or gasket substantially equal to the radial thickness of the sleeve member. In this case the unit pressure on the packing ring for a given total number of bolts and size of bolts would be decreased in proportion to the increase in annular area of the pressure surface. Increasing the size and/or number of bolts to raise the unit pressure on the packing ring would still further increase the turning moment on the follower rings and thereby make an even heavier construction necessary.

In the co-pending application, Serial No. 29,104, filed May 25, 1948, of myself and George E. Szekely, there is shown an embodiment of a pipe coupling for large diameter pipe in which the foregoing difficulties and disadvantages have been overcome by using a sleeve of the conventional thickness, that is of a thickness relatively small in proportion to its great diameter, which sleeve is strengthened by encircling it with a plurality of annular members. In this way the bolt diameter may be kept small, the bolts passing through apertures provided in the annular members close to the sleeve. Furthermore, the radial thickness of the gaskets may also be kept small, making possible a high unit pressure thereon with the use of a relatively small number of bolts.

An object of my invention is to provide an improved pipe coupling for large diameter pipe, such as penstocks, which is of simple yet strong construction and is economical to manufacture.

Another important object of my invention is to provide such a pipe coupling in which both ends of the coupling may be bolted up independently from each other.

According to my invention the coupling comprises a sleeve member of a relatively small thickness in proportion to its diameter, which sleeve member has a cylindrical ring portion projecting outwardly therefrom and preferably extending over a great part of the length of the sleeve, leaving both ends of the latter free. This cylindrical ring portion, serving to give the sleeve the required strength, may be made in one piece with the sleeve, or may form a separate ring member shrink-fitted and welded, or otherwise secured onto the sleeve.

In one form of my invention the cylindrical ring portion has bolt receiving means at both of its projecting end faces, which register with bolt holes provided in the respective follower rings facing these ends; bolt members are provided extending between one or the other of the follower rings and the respective bolt receiving means in the cylindrical ring portion for drawing up the coupling. Thus the bolts may be situated close to the sleeve and gaskets at both ends thereof and, furthermore, each follower ring is under specific and independent control, which facilitates a correct installation of the coupling.

Other objects and advantages of the invention will appear from the following description and claims in conjunction with the accompanying drawings, which show by way of example several embodiments of the invention.

In the drawings,

Figure 1 is a side view of a coupling according to my invention, installed on a pipe of large diameter;

Figure 2 shows a portion of an end view of the coupling taken on the line 2—2 of Figure 1;

Figure 3 is a fragmentary axial sectional view of the coupling of Figures 1 and 2 on an enlarged scale;

Figure 4 is a fragmentary side view of a modified coupling in accordance with the invention;

Figure 5 is a sectional view, corresponding to Figure 3, of the modified coupling of Figure 4 taken on the line 5—5 of the latter;

Figure 6 is a sectional view, corresponding to Figure 3, of a modification of the coupling shown in Figures 4 and 5; and Figure 7 is a sectional view, corresponding to Figure 3, of another form of a coupling in accordance with the invention.

Referring now to the drawings, there is shown in Figures 1 and 2 a pipe coupling 1 in accordance with my invention, installed to connect two large diameter pipes 2 and 3, which may be sections of a penstock. As may be seen in detail in Figure 3, the coupling comprises a middle ring or sleeve 4, a pair of packing rings or gaskets 5 and 6, a pair of end rings or follower rings 7 and 8, and two sets of clamping bolts 9 and 10 that serve to hold the various parts of the coupling together in a manner to be described further below.

The sleeve 4 is tubular in shape and has an inwardly projecting annular flange portion 11 adapted to abut against the ends of the pipes 2 and 3 to center the sleeve over the joint between these ends. The thickness of the sleeve 4 is relatively small in proportion to its diameter and, as shown, is much smaller than the wall thickness of the pipe. In order to provide recesses for the gaskets 5 and 6, the outer ends 12 and 13 of the sleeve 4 are flared or beveled outwardly away from the pipe wall as indicated at 14 and 15.

The packing rings or gaskets 5 and 6 are made of a suitable elastic material, such as rubber or the like, and have a tapered or wedge-shaped portion 16 and 17 adapted to be pressed into the recesses between the beveled end faces 14 and 15, respectively, of the sleeve 4 and the wall of the pipe.

The follower rings 7 and 8 may be machined from a solid ring and have a portion of their inner surface machined away to provide inwardly facing annular recesses, each bounded by an annular side wall 18 or 19 and a cylindrical wall 20 or 21, which recesses serve to receive the gaskets 5 and 6. The cylindrical walls 20 and 21 overlie the gaskets 5 and 6 and the edges of the sleeve ends 12 and 13 so that when the follower rings 7 and 8 are moved inwardly toward the sleeve 4, the gaskets 5 and 6 lie confined and compressed between the side walls 18, 19 and cylindrical walls 20, 21 of the rings 7, 8, the beveled end faces 14, 15 of the sleeve and the wall of the pipes 2, 3, thus sealing the joint at both sides. The gaskets 5 and 6 have a radial thickness that is substantially equal to the thickness of the sleeve 4.

The follower rings 7 and 8 are provided with a number of apertures 22 and 23 for the insertion of the clamping bolts 9 and 10. Because of the relatively small thickness of the sleeve ends 12, 13, the bolt apertures 22 and 23 may be positioned in a circle close to the pipe wall and gaskets 5 and 6, thus diminishing the turning moment imposed on the follower rings by the clamping bolts. Furthermore, the small radial thickness of the gaskets 5 and 6 reduces the size and/or number of the clamping bolts required for imposing the desired high unit pressure on the gaskets.

In accordance with the invention, the sleeve 4 is given the necessary strength by surrounding it with a cylindrical ring portion 24 projecting outwardly therefrom and extending over a great part of the length of the sleeve, leaving, however, both sleeve ends 12 and 13 free. This ring portion 24 may form a single piece with the sleeve 4, as shown in the embodiments of Figures 4–6, to be described further below, or may consist, as shown in Figure 3, of a separate outer ring which fits closely around the sleeve and is secured thereto in a middle position. Preferably the outer ring 24 is shrunk-fitted onto the sleeve 4 and welded thereto with circumferential welds 24 and 26.

The outer ring 24 is of substantially solid construction and has flat radial end surfaces 27 and 28 in which tapped holes 29 and 30 are provided, registering with the apertures 22 and 23, respectively, in the follower rings 7 and 8. The clamping bolts 9 and 10 are threaded at both ends, their inner ends engaging the tapped holes 29 and 30, respectively, and extend outwardly through the apertures 22 and 23, respectively, in the follower rings where they have nuts 31 and 32 screwed onto them, which nuts engage the follower rings 7 and 8 for drawing up the latter independently of each other. Although stud bolts are shown in the drawing, any equivalent bolting means may be used, such as, for instance, cap screws.

The sleeve member with the cylindrical ring portion or outer ring surrounding it provides a simple and rugged construction which is economical to fabricate as only simple parts and forms are involved. When a separate outer ring is used, as shown in Figure 3, the ring may be made by rolling a straight bar section and by drilling and tapping the holes 29 after the rolling.

In installing the coupling 1 on the pipe, the gaskets 7, 8 and follower rings 9, 10 are placed in the required order about the respective ends of the pipe sections 2 and 3, whereupon these ends are stabbed into place in the sleeve 4. The gaskets and follower rings are then moved up into position adjacent the ends of the sleeve and the coupling is assembled by means of the bolts 9, 10 and nuts 31, 32. By tightening the nuts first on the one side and then on the other, the follower rings are drawn up to complete the installation of the coupling.

The use of separate bolts for each follower ring provides the advantage that the two ends of the coupling are independent from each other, each follower ring being under specific and independent control during the bolting up. The actual work of bolting up is not increased because the same amount of torque is required as in the case where through bolts extending between the two follower rings are used. The tediousness of tightening the bolts is, however, materially reduced because less time is required per bolt for equalizing the torque.

Another advantage is obtained from the fact the irregular clearance conditions between the pipe and the middle ring can be positively located either during the process of bolting up by using a torque limiting wrench, or, after the coupling has been drawn up, by means of a torque indicating wrench. This feature is of great importance in the process of installing a coupling. In checking the effectiveness of a coupling, it has been found that conditions of excessive flow of rubber through clearances is indicated by loss of torque on the bolts after an elapsed time of at least twenty-four hours. In the case where through bolts are used engaging both follower rings, it is not possible to accurately determine the cause of torque loss. Torque loss due to one follower ring may be compensated for by the other, and the true torque loss of either one cannot be accurately determined. By using independent clamping bolts for both follower rings, any torque loss can be directly determined and located.

A further advantage of a coupling with independent ends resides in the fact that one end can be completely installed on one pipe section before the succeeding pipe section is entered into the opposite end of the coupling. Thus, for instance, the pipe 2 may be entered into the sleeve 4, the adjacent gasket 5 and follower ring 7 until it abuts the flange portion 11 and the nuts 31 tightened until sealing relationship between the pipe wall, gasket 5 and sleeve end 12 is obtained, whereafter the pipe 3 can be entered in the coupling and the nuts 32 are tightened to seal the other end of the coupling. In this way the difficulties of making a good and reliable joint on both pipes is materially reduced.

Another embodiment of the invention, also incorporating independent coupling ends, is shown in Figures 4 and 5, in which parts corresponding to those of Figures 1 to 3 have been designated by the same reference numerals with 100 added thereto.

The coupling in Figures 4 and 5 differs principally from the one shown in the previous figures in that the middle ring is made in one part, having a sleeve portion 133 with ends 112 and 113 similar to the sleeve ends 12 and 13 of Figure 3, and a cylindrical ring portion 134 similar to the outer ring 24 of Figure 3 projecting outwardly therefrom, and further in that the bolt receiving means in the ring portion 134 consist of radial slots instead of tapped holes.

The one-piece middle ring 133—134 may either be fabricated or cast. The ring portion 134 is provided at both ends with a number of radial slots 135 and 136 registering with the apertures 122 and 123, respectively, in the follower rings 107 and 108, which slots end in outwardly opening, widened nut or bolt heads receiving recesses 137 and 138, respectively. As shown, the clamping bolts 109 and 110, extending at both sides of the coupling between the follower ring and the ring portion, pass with their inner ends through the slots 135 and 136 and have square nuts 139 and 140 threaded on these ends and situated in the recesses 137 and 138, engaging the outer wall adjacent the slots 135 and 136, respectively thereof.

It will be clear that instead of bolts 109 and 110 with nuts 139 and 140, headed bolts may be used with the heads lying in the recesses 137 and 138. This is shown in Figure 6, which shows a modification of the coupling of Figures 4 and 5, and in which corresponding parts are designated by the same reference numerals with 200 added thereto.

The bolts 241 and 242 with nuts 231 and 232 engaging the follower rings 207 and 208 have square heads 243 and 244, respectively, engaging the outer walls of bolt head recesses 237 and 238 adjacent the slots 235 and 236 through which the bolts pass.

Furthermore, the coupling shown in Figure 6 differs from the one shown in Figures 4 and 5 in that the recesses 237 and 238 have been shifted with respect to each other, so that the bolts 241 and 242 no longer lie in alignment with each other, but each bolt 241 is situated interjacent to bolt 242. Thereby it is possible to give the recesses 237, 238 outwardly inclined rear walls 245 and 246 to provide sufficient room to permit the insertion one by one of the bolts 241, 242 through the slots 235, 236 in the apertures 222, 223 with the follower rings placed in position to be drawn up.

It will be understood that in the embodiment of Figures 4 and 5 and of Figure 6, the middle ring may also be made in two pieces instead of one, in the same way as shown in the embodiment of Figure 3, i. e., an inner sleeve with an outer ring surrounding the sleeve and attached thereto.

In Figure 7 there is shown a form of a coupling in accordance with my invention, in which through bolts are used engaging both follower rings at the same time for bolting up the coupling.

The coupling 301 consists of similar parts as the coupling shown in the previous drawings, corresponding parts having been given the same reference numerals with 300 added thereto. Thus the coupling 301 comprises a sleeve member 304 of relatively small thickness, surrounding the pipes 302 and 303 at the joints and having ends 312 and 313 beveled at 314 and 315 to form recesses for the gaskets 305 and 306, respectively. The recessed follower rings 307 and 308 overlie the gaskets 305 and 306 and the edges of the sleeve ends 312 and 313 and are provided with bolt apertures 322 and 323. The sleeve 304 is surrounded by a cylindrical ring portion 324, which leaves the sleeve ends 312 and 313 free, and may be made in one piece with the sleeve or may form a separate outer ring shrink-fitted into the sleeve and welded thereto at 325 and 326, as shown.

The coupling 101 differs mainly from the previously described coupling in that the outer ring 324 is provided with a number of holes or slots 348 extending through the whole length of the outer ring and registering with the apertures 322 and 323 in the follower rings 307 and 308, and in that through bolts 349 are provided extending between the follower rings and passing through the holes or slots 348 in the outer ring for drawing up the coupling. As shown, the through bolts have bolt heads 350 engaging the follower ring 307 and have at their other ends nuts 351 threaded onto them and engaging the follower ring 308.

In this way the construction of the coupling and the manufacture thereof is still more simplified. The outer ring may be made from a straight bar by rolling this bar to form and then drilling the holes 348 therein. These holes 348 may also be obtained, however, by providing slots at the inner circumference of the outer ring, for instance by flame cutting before or after rolling. When the outer ring is placed in position around the sleeve 304, the slots are closed on their inner ends by the sleeve wall as shown in Figure 7.

While the invention has been illustrated and described with reference to specific embodiments thereof, it will be understood that other embodiments may be resorted to without departing from the invention. For instance, the sleeve may be adapted to be welded or otherwise secured at one end to the end of a straight wall pipe. As shown in the drawings, the outer diameter of the cylindrical ring portion and of the follower ring are substantially alike, thus simplifying the application of a protective coating at the joints; however, other forms of follower rings or a ring portion having a diameter different from the one of the follower ring may also be used.

What I claim and desire to secure by Letters Patent is:

1. A pipe coupling for large diameter pipe comprising an integral unitary tubular sleeve member having a substantially solid continuous cylindrical ring portion projecting outwardly from the axially central portion thereof, said cylindrical ring portion covering a major portion of the external surface of the sleeve member but being disposed inwardly from the ends thereof to rigidify the portion of the sleeve member covered by said ring portion but leaving the surface of the ends of said sleeve extending in both axial directions from said ring portion entirely free to permit free elastic deformation of said ends of said sleeve member, the axial length of the ends of said sleeve member left free by said cylindrical ring portion being relatively short with respect to the axial length of said ring portion and the radial dimension of said ring portion being substantially greater than the radial dimension of said sleeve member, said ring portion being provided at both of its end faces with a plurality of bolt receiving means formed in the body of said ring portion and integral therewith, a pair of annular gaskets formed from elastic material having a thickness substantially equal to the radial thickness of said sleeve member free ends positioned one adjacent each end of said sleeve member, a pair of follower rings positioned one adjacent each gasket on the axially-outer side of said gasket, each of said follower rings having a plurality of axially-extending apertures lying in alignment with the bolt receiving means at the end face of said ring portion of the sleeve facing the ring and having axes at least as close to the radially inner surface of each follower ring as to the radially outer surface thereof, and the radially inner edges of said apertures being spaced from the radially inner surface of each follower ring a distance which is less than half the distance from said radially inner surface to the radially outer edges of said apertures, and a plurality of bolt members extending through the apertures in said follower rings and engaging said bolt receiving means in said ring portion for urging said follower rings against said gaskets independently of one another, said bolt members being disposed radially outside the gaskets and inside the outer periphery of said ring portion.

2. A pipe coupling for large diameter pipe comprising an integral unitary tubular sleeve member having a substantially solid continuous cylindrical ring member fitting around the sleeve member and secured thereto, said ring member projecting outwardly from the axially central portion of said sleeve member, and said ring member covering a major portion of the external surface of the sleeve member but being disposed inwardly of the ends of said sleeve member to rigidify the portion of the sleeve member covered by said ring member but leaving the surface of the ends of said sleeve extending in both axial directions from said ring member entirely free to permit free elastic deformation of said ends of said sleeve member, the axial length of the ends of said sleeve member left free by said cylindrical ring member being relatively short with respect to the axial length of said ring member and the radial dimension of said ring member being substantially greater than the radial dimension of said sleeve member, and said ring member being provided at both of its end faces with a plurality of bolt receiving means formed in the body of said ring member and integral therewith, a pair of annular gaskets formed from elastic material having a thickness substantially equal to the radial thickness of said sleeve member free ends positioned one adjacent each end of said sleeve member, a pair of follower rings positioned one adjacent each gasket on the axially-outer side of said gasket, each of said follower rings having a plurality of axially-extending apertures lying in alignment with the bolt receiving means at the end face of said ring member facing the follower ring and having axes at least as close to the radially inner surface of each follower ring as to the radially outer surface thereof, and the radially inner edges of said apertures being spaced from the radially inner surface of each follower ring a distance which is less than half the distance from said radially inner surface to the radially outer edges of said apertures and a plurality of bolt members extending through the apertures in said follower rings and engaging said bolt receiving means in said ring member for urging said follower rings aaginst said gaskets independently of one another, said bolt members being disposed radially outside the gaskets and inside the outer periphery of said ring portion.

3. A pipe coupling for large diameter pipe comprising an integral unitary tubular sleeve member having a substantially solid continuous cylindrical ring portion projecting outwardly from the axially central portion thereof, said cylindrical ring portion covering a major portion of the external surface of the sleeve member but being disposed inwardly from the ends thereof to rigidify the portion of the sleeve member covered by said ring portion but leaving the surface of the ends of said sleeve extending in both axial directions from said ring portion entirely free to permit free elastic deformation of said ends of said sleeve member, the axial length of the ends of said sleeve member left free by said cylindrical ring portion being relatively short with respect to the axial length of said ring portion and the radial dimension of said ring portion being substantially greater than the radial dimension of said sleeve member, and said ring portion being provided at both of its end faces with a plurality of bolt receiving means formed in the body of said ring portion and integral therewith, a pair of annular gaskets formed from elastic material having a thickness substantially equal to the radial thickness of said sleeve member free end positioned one adjacent each end of said sleeve member, a pair of follower rings positioned one adjacent each gasket on the axially-outer side of said gasket and each provided with a plurality of axially-extending apertures lying in alignment with the bolt-receiving means at the end face of said ring portion facing the follower ring and having axes at least as close to the radially inner surface of each follower ring as to the radially outer surface thereof, and the radially inner edges of said apertures being spaced from the radially inner surface of each follower ring a distance which is less than half the distance from said radially inner surface to the radially outer edges of said apertures, said follower rings having part of their inner surfaces cut away to form inwardly facing annular recesses for said gaskets, the cylindrical outer wall of said annular recesses overlying said gaskets and the outer free edges of said sleeve member, and a plurality of bolt members extending through the apertures in said follower rings and engaging said bolt receiving means in said ring portion for urging said follower rings against said gaskets independently of one another, said bolt members being disposed radially outside the gaskets and inside the outer periphery of said ring portion.

4. A pipe coupling for large diameter pipe comprising an integral unitary tubular sleeve member having a substantially solid continuous cylindrical ring portion projecting outwardly from the axially central portion thereof, said cylindrical ring portion covering a major portion of the external surface of the sleeve member but being disposed inwardly from the ends thereof to rigidify the portion of the sleeve member covered by said ring portion but leaving the surface of the ends of said sleeve extending in both axial directions from said ring portion entirely free to permit free elastic deformation of said ends of said sleeve member, the axial length of the ends of said sleeve member left free by said cylindrical ring portion being relatively short with respect to the axial length of said ring portion and the radial dimension of said ring portion being substantially greater than the radial dimension of said sleeve member, the inner surface of said ends of said sleeve member being outwardly beveled to provide an annular outwardly diverging space between said sleeve ends and the pipe wall, a pair of annular gaskets formed from elastic material having a thickness substantially equal to the radial thickness of said sleeve member free ends positioned one adjacent each end of said sleeve member engaging said annular space, a pair of followers positioned one adjacent each gasket on the axially-outer side of said gasket and having part of their inner surface cut away to form an inwardly facing annular recess for said gasket, the cylindrical outer wall of said annular recesses overlying said gaskets and the outer free edges of said sleeve member, said followers being provided with axially-extending apertures having axes at least as close to the radially inner surface of each follower as to the radially outer surface thereof, and the radially inner edges of said apertures being spaced from the radially inner surface of each follower ring a distance which is less than half the distance from said radially inner surface to the radially outer edges of said apertures, and a plurality of clamping bolt members extending between the one and the other of said followers and said cylindrical ring portion for urging said followers against said gaskets independently of one another, said bolt members being disposed radially outside the gaskets and inside the outer periphery of said ring portion.

5. In a pipe line comprising a plurality of axially-aligned large diameter pipe sections, a pipe coupling joining adjacent pipe sections in fluid-tight relationship, said coupling comprising an integral unitary tubular sleeve member having a radial thickness less than the thickness of the wall of said large diameter pipe and having gasket recesses at its opposite ends and a coaxial, annular continuous outer ring portion projecting outwardly from and surrounding the axially central portion of said sleeve member, said cylindrical ring portion covering a major portion of the external surface of the sleeve member but being disposed inwardly from the ends thereof to rigidify the portion of the sleeve member covered by said ring portion but leaving the surface of the ends of said sleeve extending in both axial directions from said ring portion entirely free to permit free elastic deformation of said ends of said sleeve member, the axial length of the ends of said sleeve member left free by said cylindrical ring portion being relatively short with respect to the axial length of said ring portion and the radial dimension of said ring portion being substantially greater than the radial dimension of said sleeve member, said outer ring portion having a circular series of axial apertures formed in the body of said ring portion and integral therewith for receiving bolts extending axially of the sleeve member, a pair of annular gaskets formed from elastic material having a thickness substantially equal to the radial thickness of said sleeve member free ends positioned one adjacent each end of said sleeve member in said gasket recesses, a pair of annular gasket followers positioned one adjacent each annular gasket on the axially-outer side of said gasket, said followers being provided with axially-extending apertures having axes at least as close to the radially inner surface of each follower as to the radially outer surface thereof, and the radially inner edges of said apertures being spaced from the radially inner surface of each follower ring a distance which is less than half the distance from said radially inner surface to the radially outer edges of said apertures, and a plurality of clamping bolt members received in the apertures of said outer ring portion and of said followers and engaging said followers for drawing them inwardly toward the sleeve member to compress said gaskets, said bolt members being disposed radially outside said gaskets and inside the outer periphery of the outer ring portion.

6. In a pipe line comprising a plurality of axially-aligned large diameter pipe sections, a pipe coupling joining adjacent pipe sections in fluid-tight relationship, said coupling comprising an integral unitary tubular sleeve member having a radial thickness less than the thickness of the wall of said large diameter pipe and having gasket recesses at its opposite ends and a coaxial, annular continuous outer ring portion projecting outwardly from and surrounding the central axial portion of said sleeve member, said cylindrical ring portion covering a major portion of the external surface of the sleeve member but being disposed inwardly from the ends thereof to rigidify the portion of the sleeve member covered by said ring portion but leaving the surface of the ends of said sleeve extending in both axial directions from said ring portion entirely free to permit free elastic deformation of said ends of said sleeve member, the axial length of the ends of said sleeve member left free by said cylindrical ring portion being relatively short with respect to the axial length of said ring portion and the radial dimension of said ring portion being substantially greater than the radial dimension of said sleeve member, said outer ring portion having a circular series of axial bolt holes formed in the body of said ring portion and integral therewith for receiving bolts extending axially of the sleeve, a pair of annular gaskets formed from elastic material having a thickness substantially equal to the radial thickness of said sleeve member positioned one adjacent each end of said sleeve member free ends in said gasket recesses, a pair of annular gasket followers positioned one adjacent each annular gasket on the axially-outer side of said gasket, said followers being provided with apertures having axes at least as close to the radially inner surface of each follower as to the radially outer surface thereof, and the radially inner edges of said apertures being spaced from the radially inner surface of each follower ring a distance which is less than half the distance from said radially inner surface to the radially outer edges of said apertures, and a plurality of clamping bolts secured in the apertures of said outer ring portion and of said followers and extending between said outer ring portion and each of said gasket followers respectively for urging said followers against said gaskets independently of one another, said bolts being disposed radially outside said gaskets and inside the outer periphery of the outer ring portion.

References Cited in the file of this patent

UNITED STATES PATENTS

| Number | Name | Date |
|---|---|---|
| 364,449 | Story | June 7, 1887 |
| 436,574 | Bramwell | Sept. 16, 1890 |
| 552,319 | Farrey | Dec. 31, 1895 |
| 754,258 | Tinker | Mar. 8, 1904 |
| 841,881 | Montie | Jan. 22, 1907 |
| 1,363,974 | Heylman | Dec. 28, 1920 |
| 1,680,499 | Clark | Aug. 14, 1928 |
| 1,813,529 | Clark | July 7, 1931 |
| 1,853,168 | Murphy | Apr. 12, 1932 |
| 1,940,729 | Pfefferle | Dec. 26, 1933 |
| 2,001,614 | Johnson | May 14, 1935 |
| 2,009,744 | Pfefferle | July 30, 1935 |
| 2,108,848 | Engel et al. | Feb. 22, 1938 |
| 2,197,450 | Curtis | Apr. 16, 1940 |
| 2,438,472 | Calcott | Mar. 23, 1948 |